(12) United States Patent
Oide et al.

(10) Patent No.: US 10,340,485 B2
(45) Date of Patent: Jul. 2, 2019

(54) POWER STORAGE DEVICE

(71) Applicant: KABUSHIKI KAISHA TOYOTA JIDOSHOKKI, Kariya-shi, Aichi-ken (JP)

(72) Inventors: Ryuji Oide, Kariya (JP); Mikiya Kurita, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/770,519

(22) PCT Filed: Nov. 9, 2016

(86) PCT No.: PCT/JP2016/083286
§ 371 (c)(1),
(2) Date: Apr. 24, 2018

(87) PCT Pub. No.: WO2017/082317
PCT Pub. Date: May 18, 2017

(65) Prior Publication Data
US 2019/0081288 A1    Mar. 14, 2019

(30) Foreign Application Priority Data
Nov. 10, 2015  (JP) .................. 2015-220393

(51) Int. Cl.
*H01M 2/04* (2006.01)
*B60L 11/18* (2006.01)
(Continued)

(52) U.S. Cl.
CPC ....... *H01M 2/0439* (2013.01); *B60L 11/1879* (2013.01); *H01M 2/0473* (2013.01);
(Continued)

(58) Field of Classification Search
CPC ............ H01M 2/0439; H01M 2/0473; H01M 2/0486; H01M 2/024
See application file for complete search history.

(56) References Cited

U.S. PATENT DOCUMENTS

2010/0028759 A1    2/2010  Ebine et al.
2010/0258538 A1   10/2010  Suzuki et al.
(Continued)

FOREIGN PATENT DOCUMENTS

CN    103996806 A    8/2014
DE   102014205580 A1  10/2014
(Continued)

OTHER PUBLICATIONS

Written Opinion dated Dec. 27, 2016 from the International Searching Authority in application No. PCT/JP2016/083286.

*Primary Examiner* — Jimmy Vo
(74) *Attorney, Agent, or Firm* — Sughrue Mion, PLLC

(57) ABSTRACT

A lid of a rechargeable battery includes a lid body that closes an opening of a case body and is supported by a case-side mating surface surrounding the opening of the case body. The lid also includes an inserted portion having a shape of a quadrangular column. The inserted portion protrudes from the lid body toward an inner part of the case body and extends along an inner circumferential surface of the case body. The lid also includes a rounded corner present in the distal end of the inserted portion in a protruding direction in which the inserted portion protrudes from the lid body. The lower limit of an edge-removal dimension of the corner is equal to an average particle diameter of a material for the lid.

12 Claims, 4 Drawing Sheets

(51) Int. Cl.
  *H01M 2/02*        (2006.01)
  *B23K 26/21*       (2014.01)
(52) U.S. Cl.
  CPC .......... *H01M 2/0486* (2013.01); *B23K 26/21*
      (2015.10); *H01M 2/024* (2013.01); *H01M*
                                  *2220/20* (2013.01)

(56)             References Cited

U.S. PATENT DOCUMENTS

2012/0079713  A1    4/2012   Hosokawa et al.
  2014/0315071  A1   10/2014   Tsutsumi et al.
  2016/0211491  A1    7/2016   Iwasaki et al.

FOREIGN PATENT DOCUMENTS

JP          11-86809   A     3/1999
  JP        2002-292486  A    10/2002
  JP        2006-324160  A    11/2006
  JP        2008-159536  A     7/2008
  JP        2009-146645  A     7/2009
  JP         2012-79476  A     4/2012
  JP         2014-93257  A     5/2014
  JP         2015-11948  A     1/2015
  WO         2015049957  A1    4/2015

Fig.4
|  | Example 1 | Example 2 | Example 3 | Comparative example |
|---|---|---|---|---|
| Edge-removal dimension (mm) | 0.15 | 0.25 | 0.30 | 0.045 |
| Presence or absence of burr | Absent | Absent | Absent | Present |
Fig.5
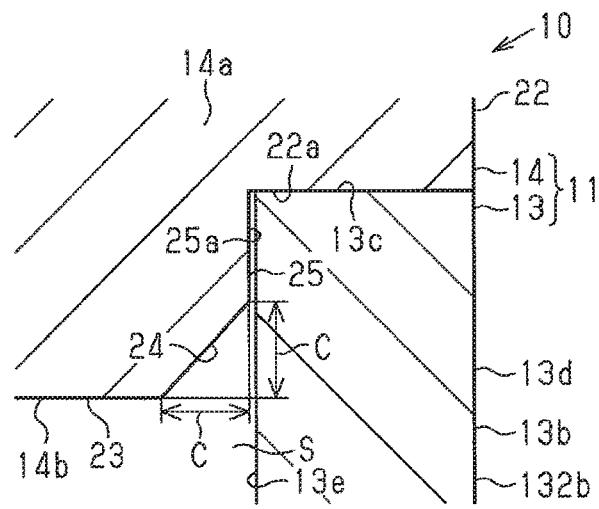
Fig.6
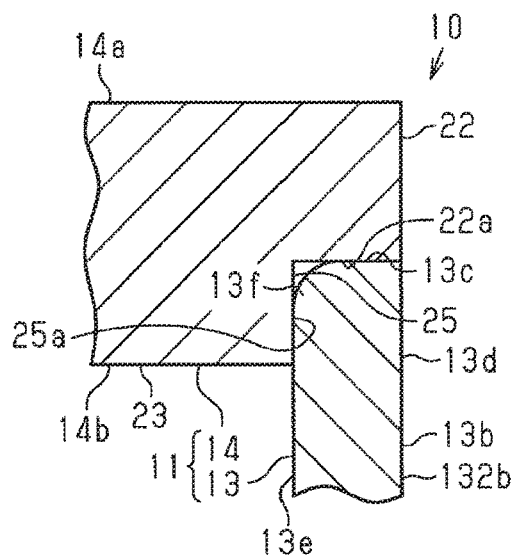

POWER STORAGE DEVICE

CROSS REFERENCE TO RELATED APPLICATIONS

This application is a National Stage of International Application No. PCT/JP2016/083286, filed on Nov. 9, 2016, which claims priority from Japanese Patent Application No. 2015-220393, filed on Nov. 10, 2015.

TECHNICAL FIELD

The present invention relates to a power storage device that includes a tubular case body with a closed end having an opening and also includes a lid that closes the opening.

BACKGROUND ART

Vehicles such as electric vehicles (EV) and plug-in hybrid vehicles (PHV) include rechargeable batteries as a power storage device that stores power to be supplied to a motor for driving. The rechargeable batteries may include an electrode assembly and a case. The electrode assembly includes positive electrodes and negative electrodes stacked on one another with separators located in between. The case accommodates the electrode assembly. The case is formed by welding a case body and a lid as in Patent Document 1.

As shown in FIG. 8, a case body 81 before welding has a tubular shape with an opening on the top surface thereof. A first protrusion 82 protrudes from an outer surface 81a of the case body 81 around the entire circumference of the case body 81. Further, a lid 83 before welding has a size such that the lid 83 is supported on an opening end surface of the case body 81. The lid 83 also has a portion to be inserted into the case body 81. A second protrusion 84 protrudes from an outer surface 83a of the lid 83 around the entire circumference of the lid 83.

When the case is manufactured, an inserted portion 86, which is a part of the lid 83, is inserted into the case body 81 and the outer circumferential portion of the lid 83 is placed on the opening end surface of the case body 81. Further, the outer surface 81a of the case body 81 and the outer surface 83a of the lid 83 are arranged to be flush with each other, such that the first protrusion 82 and the second protrusion 84 constitute a protrusion 85. Then the protrusion 85 is irradiated with a laser beam to become a part of a weld zone, so that the case body 81 and the lid 83 are welded together, thereby forming the case.

PRIOR ART DOCUMENT

Patent Document

Patent Document 1: Japanese Laid-Open Patent Publication No. 2009-146645

SUMMARY OF THE INVENTION

Problems that are to be Solved by the Invention

When the case is manufactured, the inserted portion 86 of the lid 83 is inserted into the case body 81. In this case, the distal end of the inserted portion 86 in the insertion direction may be scraped by the inner circumferential surface of the case body 81, so that filamentary foreign matter would be produced at the distal end of the inserted portion 86. In contrast, the inner circumferential edge extending along the opening of the case body 81 may be scraped by the inserted portion 86, so that filamentary foreign matter would be produced at the inner circumferential edge of the case body 81.

It is an objective of the present invention to provide a power storage device by which the development of foreign matter is prevented when a case is manufactured.

Means for Solving the Problem

In order to solve the above problem, according to a first embodiment of the present invention, a power storage device including a metal tubular case body with a closed end, the case body having an opening, and a metal lid that closes the opening is provided. The lid includes a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner present in a distal end of the inserted portion in a protruding direction in which the inserted portion protrudes from the lid body. The lower limit of an edge-removal dimension of the rounded corner or the chamfered corner is equal to an average particle diameter of a material for the lid.

If the distal end of the inserted portion is scraped by the inner circumferential surface of the case body, the minimum size of filamentary foreign matter that may be developed at the inserted portion is equal to the minimum particle diameter of the material for the inserted portion (lid). Accordingly, the sharp edge is removed from the distal end of the inserted portion in advance with the lower limit of the edge-removal dimension set to the average particle diameter greater than the minimum particle diameter of the material for the inserted portion (lid). Thus, when the inserted portion is inserted into the case body, the distal end of the inserted portion is prevented from being scraped by the inner circumferential surface of the case body and the development of filamentary foreign matter is prevented.

In the power storage device, preferably, the lower limit of the edge-removal dimension of the corner is equal to the maximum particle diameter in the particle size distribution of the material for the lid.

With this configuration, by setting the edge-removal dimension of the corner to a greater value, the development of the filamentary foreign matter is prevented.

In the power storage device, in a situation where the dimension of the inserted portion in the protruding direction represents the thickness of the inserted portion, preferably, the edge-removal dimension of the corner is smaller than a value obtained by subtracting the value of the clearance between the lid body and the opening end surface from the thickness of the inserted portion.

With this configuration, the value obtained by subtracting the value of clearance from the thickness of the inserted portion is equal to the length of the inserted portion in a portion between the opening end surface and the bottom of the case body in the protruding direction. A corner having a dimension smaller than this length ensures a location between the opening end surface and the bottom of the case body in the inserted portion even if the corner is prepared in the distal end of the inserted portion.

In order to solve the above problem, according to a second embodiment of the present invention, a power storage device including a metal tubular case body with a closed end, the case body having an opening, and a metal lid that closes the opening is provided. The lid includes a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner, which is present in at least one of a distal end of the inserted portion in a protruding direction in which the inserted portion protrudes from the lid body and an inner circumferential edge extending along the opening of the case body. The lower limit of an edge-removal dimension of the rounded corner or the chamfered corner is equal to an average particle diameter of a material for a member where the corner is present.

If the distal end of the inserted portion is scraped by the inner circumferential surface of the case body or the inner circumferential edge of the case body is scraped by the inserted portion of the lid, the minimum size of filamentary foreign matter that may be developed is equal to the minimum particle diameter of the material for the lid or the case body. Accordingly, the sharp edge is removed in advance at least from one of the distal end of the inserted portion and the opening end of the case body with the lower limit of the edge-removal dimension set to the average particle diameter greater than the minimum particle diameter of the material for the lid or the case body. Thus, when the inserted portion is inserted into the case body, the distal end of the inserted portion is prevented from being scraped by the inner circumferential surface of the case body and the inner circumferential edge of the case body is prevented from being scraped by the distal end of the inserted portion, thereby preventing the development of filamentary foreign matter.

In the power storage device, the corner is preferably present in the one of the inserted portion of the lid and the case body that has the lower Vickers hardness.

With this configuration, the material having a lower Vickers hardness is softer and is more prone to be scraped than the material having a greater Vickers hardness. Accordingly, by providing the corner in the member made of the material prone to be scraped, the development of the filamentary foreign matter is further prevented.

In the power storage device, the Vickers hardness of the inserted portion is preferably lower than the Vickers hardness of the case body, and the corner is preferably present in the distal end of the inserted portion.

With this configuration, since the inserted portion is softer than the case body, the inserted portion is prone to develop the filamentary foreign matter by being scraped by the inner circumferential surface of the case body. Accordingly, the sharp edge is removed from the inserted portion in advance to prepare the corner. Thus, when the inserted portion is inserted into the case body, the distal end of the inserted portion is prevented from being scraped by the inner circumferential surface of the case body and the development of the filamentary foreign matter is prevented.

In the power storage device, the lower limit of the edge-removal dimension of the corner is preferably equal to the maximum particle diameter in the particle size distribution of the material for the corner.

With this configuration, by setting the edge-removal dimension of the corner to a greater value, the development of the filamentary foreign matter is prevented.

In the power storage device, the edge-removal dimension of the corner is preferably 0.15 mm or more.

With this configuration, by setting the edge-removal dimension of the corner to a greater value, the development of the filamentary foreign matter is prevented.

In order to solve the above problem, according to a third embodiment of the present invention, a power storage device including a metal tubular case body with a closed end, the case body having an opening, and a metal lid that closes the opening is provided. The lid includes a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner present in a distal end of the inserted portion in a protruding direction in which the inserted portion protrudes from the lid body. The lower limit of an edge-removal dimension of the rounded corner or the chamfered corner is 0.15 mm or more.

The power storage device is preferably a rechargeable battery.

In the power storage device, the lid and the case body are preferably made of aluminum.

In order to solve the above problem, according to a fourth embodiment of the present invention, a method for manufacturing a power storage device including a metal tubular case body with a closed end, the case body having an opening, and a metal lid that closes the opening is provided. The lid has a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner present in a distal end of the inserted portion in a protruding direction in which the inserted portion protrudes from the lid body. The method forms the rounded corner or the chamfered corner with a lower limit of an edge-removal dimension set to an average particle diameter of a material for the lid.

In order to solve the above problem, according to a fifth embodiment of the present invention, a method for manufacturing a power storage device including a metal tubular case body with a closed end, the case body having an opening, and a metal lid that closes the opening is provided. The lid has a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner, which is present in at least one of a distal end of the inserted portion in a protruding direction in which the inserted portion protrudes from the lid body and an inner circumferential edge extending along the opening of the case body. The method forms the rounded corner or the chamfered corner with a lower limit of an edge-removal dimension set to an average particle diameter of a material for a member in which the corner is formed.

Effects of the Invention

The present invention prevents the development of foreign matter when a case is manufactured.

BRIEF DESCRIPTION OF THE DRAWINGS

FIG. 4 is a table describing the presence or absence of foreign matter in examples and a comparative example.

FIG. 5 is a partial cross-sectional view showing a chamfered corner in an enlarged manner.

FIG. 6 is a partial cross-sectional view showing a corner of the case body in an enlarged manner.

EMBODIMENTS OF THE INVENTION

In the following, a power storage device according to the present invention embodied as a rechargeable battery will be described with reference to FIGS. 1 to 4.

Figure 1:
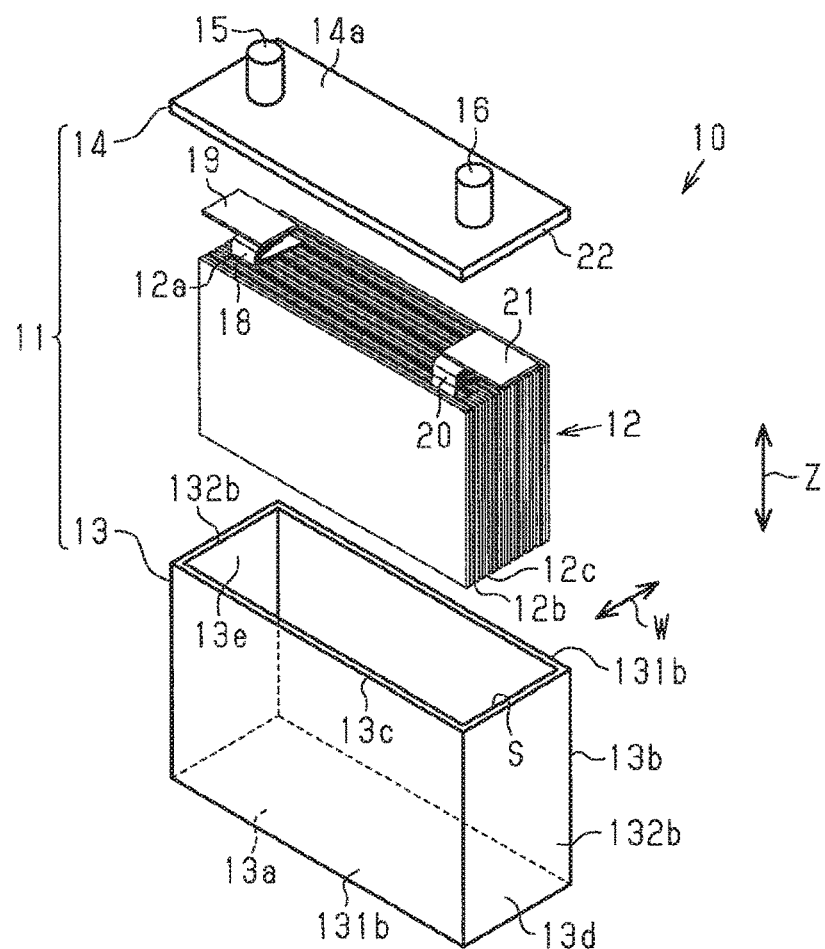
FIG. 1 is an exploded perspective view showing a rechargeable battery according to one embodiment of the present invention.

As shown in FIG. 1, in a rechargeable battery 10 serving as the power storage device, a case 11 accommodates an electrode assembly 12. The case 11 includes a case body 13 having a shape of a quadrangular tube with an opening S and also includes a lid 14 having a shape of a rectangular plate that closes the opening S. The case body 13 and the lid 14 are made of aluminum of the 1000 series, which is a material having a tensile strength of 85 MPa and an average particle diameter of 0.05 mm. The rechargeable battery 10 according to the present embodiment is a rectangular battery having a rectangular outer shape. Further, the rechargeable battery 10 according to the present embodiment is a lithium-ion battery.

The electrode assembly 12 includes positive electrodes 12a, negative electrodes 12b, and separators 12c insulating the positive electrodes 12a and the negative electrodes 12b from each other. Each of the positive electrodes 12a includes a positive-electrode foil (such as an aluminum foil) and positive-electrode active material layers containing a positive-electrode active material disposed on both surfaces of the positive-electrode foil. Each of the negative electrodes 12b includes a negative-electrode foil (such as a copper foil) and negative-electrode active material layers containing a negative-electrode active material disposed on both surfaces of the negative-electrode foil.

The electrode assembly 12 has a stacking structure in which the positive electrodes 12a and the negative electrodes 12b are alternately stacked such that the active material layers of the positive electrodes 12a and the negative electrodes 12b face each other, and the separators 12c are arranged between the corresponding positive and negative electrodes. The separators 12c are microporous films. The direction in which the active material layers of the positive electrodes 12a and the negative electrodes 12b face each other is referred to as a stacking direction W of the electrode assembly 12.

The rechargeable battery 10 includes a positive-electrode conductive plate 19, which is made of metal, joined to a positive-electrode tab 18 protruding from the corresponding positive electrodes 12a and a negative-electrode conductive plate 21, which is made of metal, joined to a negative-electrode tab 20 protruding from the corresponding negative electrodes 12b. The positive-electrode tabs 18 and the negative-electrode tabs 20 are respectively joined together by welding, for example. The positive-electrode conductive plate 19 is electrically connected to a positive terminal 15 extending from the lid 14 to be exposed out of the case 11. The negative-electrode conductive plate 21 is electrically connected to a negative terminal 16 exposed out of the case 11 in the same manner as the positive terminal 15. This allows the electrode assembly 12 to be electrically connected to the positive terminal 15 and the negative terminal 16.

In the following, the case body 13 and the lid 14 are described in detail.

First, the structures of the case body 13 and the lid 14 are described.

The case body 13 is formed by deep drawing. The Vickers hardness of the case body 13 is 25.7 HV. The case body 13 has a shape of a quadrangular tube with a closed end. The case body 13 includes a bottom wall 13a having a shape of a rectangular plate and a circumferential wall 13b having a shape of a quadrangular tube erected on the four sides of the bottom wall 13a. The circumferential wall 13b includes long side walls 131b erected on a pair of long edges of the bottom wall 13a and short side walls 132b erected on a pair of short edges of the bottom wall 13a. Inner surfaces of the pair of the long side walls 131b face both end surfaces of the electrode assembly 12 in the stacking direction W.

A direction orthogonal to the inner surface and the outer surface of the bottom wall 13a of the case body 13 and connecting the bottom wall 13a to the lid 14 by the shortest distance is referred to as an extending direction Z of the case 11. The case body 13 includes a case-side mating surface 13c in the opening end surface of the circumferential wall 13b surrounding the opening S. The case-side mating surface 13c supports the lid 14 and is in contact with the lid 14. The case-side mating surface 13c is a flat surface orthogonal to the extending direction Z of the case 11 and in parallel with the inner surface of the bottom wall 13a. Further, an inner circumferential surface 13e and an outer circumferential surface 13d of the circumferential wall 13b are flat surfaces orthogonal to the case-side mating surface 13c and extending in the extending direction Z of the case 11.

Figure 2:
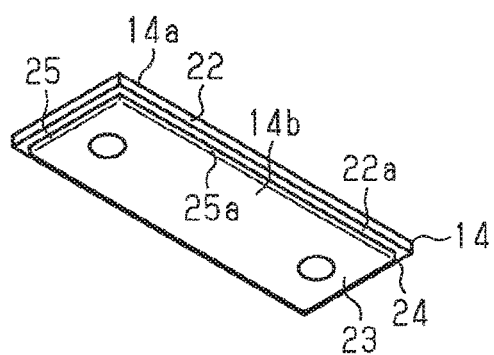
FIG. 2 is a perspective view of a lid as viewed from an inserted portion and corners.
Figure 3A:
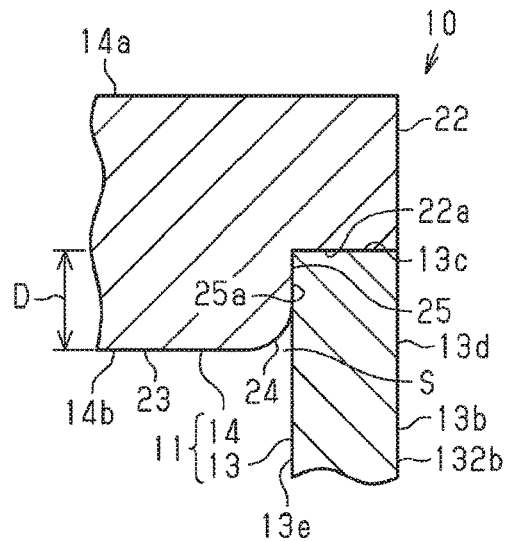
FIG. 3A is a partial cross-sectional view showing a mating area of a case body and the lid in an enlarged manner.

As shown in FIG. 2 or FIG. 3A, the lid 14 includes a lid body 14a having a shape of a rectangular plate, and the lid 14 also includes an inserted portion 23 protruding from the lid body 14a and having a shape of a quadrangular column. The lid body 14a closes the opening S surrounded by the circumferential wall 13b and is supported by the case-side mating surface 13c of the circumferential wall 13b.

The inserted portion 23 protrudes from the lid body 14a toward the bottom wall 13a of the case body 13, and the inserted portion 23 is slightly smaller than the outer circumferential surface of the lid body 14a. The inserted portion 23 has a shape of a quadrangular column extending along the inner circumferential surface 13e of the circumferential wall 13b within the case body 13. The outer circumferential surface of the inserted portion 23 faces and abuts on the inner circumferential surface 13e of the case body 13, such that the movement of the lid 14 along the case-side mating surface 13c is limited. In the lid body 14a, a portion extending outward from the inserted portion 23 is a flange 22.

The lid 14 is formed by a rectangular plate made of aluminum. The lid 14 is manufactured by pressing the flange 22 such that the inserted portion 23 protrudes. The Vickers hardness of the flange 22 manufactured by pressing is greater than that of the inserted portion 23 manufactured without pressing. Accordingly, the inserted portion 23 is softer than the flange 22 in the lid 14. In the present embodiment, the Vickers hardness of the flange 22 is 22.6 HV.

The flange 22 is manufactured by pressing. The Vickers hardness of the flange 22 is lower than that of the case body 13 formed by deep drawing. Accordingly, the Vickers hardness of the inserted portion 23 is lower than that of the flange 22 and is also lower than that of the case body 13. Accordingly, the inserted portion 23 is softer than the case body 13.

The lid 14 is supported in a state where the flange 22 is in contact with the case-side mating surface 13c of the circumferential wall 13b. In the present embodiment, a portion corresponding to the flange 22 in an inner end surface 14b of the lid 14 constitutes a lid-side mating surface 22a, which faces and is in contact with the case-side mating surface 13c. The lid-side mating surface 22a has a shape of a flat surface.

In the lid 14, the direction in which the inserted portion 23 protrudes from the lid body 14a is referred to as a protruding direction. Further, the dimension of the inserted portion 23 in this protruding direction is referred to as a thickness direction D. The lid 14 includes a rounded corner 24 at the distal end of the inserted portion 23 in the protruding direction. The lid 14 further includes a body 25 between the corner 24 and the lid body 14a in the protruding direction. As described above, the inserted portion 23 is softer than the case body 13. Accordingly, the corner 24 is present in the lid 14 having a lower Vickers hardness between the case body 13 and the lid 14.

An outer side surface 25a of the body 25 is a flat surface extending in the extending direction Z of the case 11. The body 25 has a shape of a quadrangular column. Accordingly, the outer side surface 25a of the body 25 extends along the inner circumferential surface 13e of the circumferential wall 13b. The outer side surface 25a of the body 25 abuts on the inner circumferential surface 13e of the circumferential wall 13b, such that the movement of the lid 14 in the thickness direction of the circumferential wall 13b is limited.

Figure 3B:
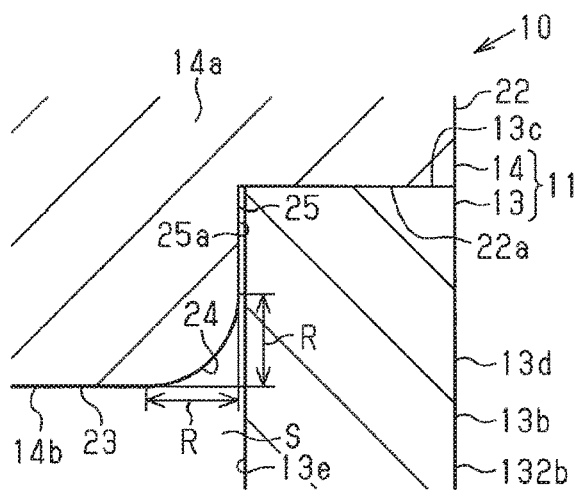
FIG. 3B is a partial cross-sectional view showing the inserted portion, a corner, and a body in an enlarged manner.

As shown in FIG. 3B, the rounded corner 24 is formed into a rounded shape. In the rechargeable battery 10, in order to maximize the volume of the electrode assembly 12 accommodated within the case 11, the thicknesses of the lid 14 and the case body 13 are designed to be as small as possible. Accordingly, the thickness D of the inserted portion 23 of the lid 14 is designed to be as small as possible. In contrast, it is necessary to have a required thickness for the body 25 in the inserted portion 23 in order to limit the movement of the lid 14 along the case-side mating surface 13c by the body 25. In view of this, it is necessary not to have an excessive dimension with which the sharp edge is removed from the distal end of the inserted portion 23 (hereafter referred to as an edge-removal dimension R).

The lower limit of the edge-removal dimension R is set to an average particle diameter of aluminum, which is the material for the lid 14 as a member in which the corner 24 is present. In the present embodiment, the lower limit is set to 0.05 mm. When the inserted portion 23 is inserted into the opening S of the case body 13, this value prevents the development of filamentary foreign matter resulting from scraping of the inserted portion 23 by the inner circumferential surface 13e of the circumferential wall 13b. By removing the sharp edge from the distal end of the inserted portion 23 in advance with the edge-removal dimension R equal to or higher than the average particle diameter of aluminum, the distal end of the inserted portion 23 is prevented from being scraped by the inner circumferential surface 13e of the circumferential wall 13b and the development of foreign matter of a minimum size that may be developed is prevented. Accordingly, in the present embodiment, the following inequality 1 holds.

$$\text{Average particle diameter} \leq \text{Edge-removal dimension } R \quad \text{(Inequality 1)}$$

The lower limit of the edge-removal dimension R is set to the average particle diameter of aluminum. Accordingly, the edge-removal dimension R may be the average particle diameter of aluminum or more.

As a result of a random observation of sections of an aluminum material using SEM-EBSD, the largest one of the particle diameters of aluminum particles is set as the maximum particle diameter of aluminum. In the present embodiment, the maximum particle diameter is 0.2 mm, so that the lower limit of the edge-removal dimension R may be set to 0.2 mm. However, in general, it is well known that the unevenness of the particle diameters and the particle size distribution of aluminum materials differ depending on various conditions upon manufacturing especially a heat treatment temperature, for example. Accordingly, an average value of the maximum particle diameters of aluminum particles observed in a plurality of SEM images of the rechargeable battery 10 may be set as the maximum particle diameter.

When the inserted portion 23 is inserted into the opening S of the case body 13, in order to prevent the distal end of the inserted portion 23 from being scraped by the inner circumferential surface 13e of the circumferential wall 13b, the edge-removal dimension R is preferably large. However, if the edge-removal dimension R is too large, the entire outer side surface of the inserted portion 23 will have an arcuate shape and the body 25 will not be formed. This is not preferable.

Figure 3C:
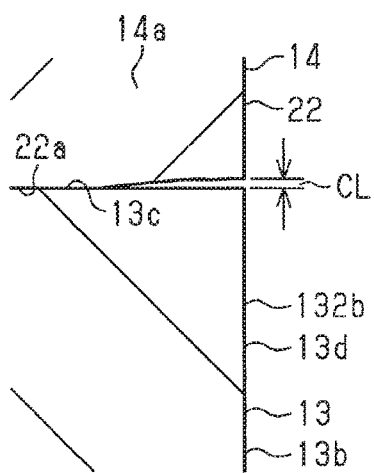
FIG. 3C is a partial cross-sectional view showing a maximum clearance in an enlarged manner.

As shown in FIG. 3C, in order to form the body 25, it is necessary to have the thickness D of the inserted portion 23 greater than the maximum value of a clearance CL that may be formed between the case-side mating surface 13c of the circumferential wall 13b and the lid-side mating surface 22a of the flange 22. The clearance CL is defined by the flatness of the lid-side mating surface 22a in the flange 22. The flatness is a numerical value indicating the degree of finishing of a certain flat surface, representing the difference between the most protruding portion and the most recessed portion on the flat surface. Accordingly, as the flatness becomes smaller, the lid-side mating surface 22a is smoother and the clearance CL becomes smaller. As the clearance CL becomes smaller, the gap between the lid-side mating surface 22a and the case-side mating surface 13c becomes smaller.

In order to provide the rounded corner 24 in the inserted portion 23 while forming the body 25, it is necessary to set the dimension obtained by subtracting the clearance CL from the thickness D of the inserted portion 23 to be greater than the edge-removal dimension R. Accordingly, in the present embodiment, the following inequality 2 holds.

$$\text{Edge-removal dimension } R < \text{Thickness } D \text{ of the inserted portion 23} - \text{Clearance } CL \quad \text{(Inequality 2)}$$

Accordingly, from the inequality 1 and the inequality 2, the edge-removal dimension R is set by the following inequality 3.

Average particle diameter of aluminum≤Edge-removal dimension $R$<Thickness $D$ of the inserted portion 23−Clearance $CL$ (Inequality 3)

The case body 13 and the lid 14 are integrally formed by joining a mating area of the case-side mating surface 13c and the lid-side mating surface 22a through laser welding outside the case 11.

Evaluation Example: Assembly Test

Whether filamentary foreign matter was developed when the lids 14 in Example 1, Example 2, Example 3, and a comparative example were assembled with the case body 13 was determined. The edge-removal dimension R for the lid 14 in Example 1 was 0.15 mm, the edge-removal dimension R for the lid 14 in Example 2 was 0.25 mm, and the edge-removal dimension R for the lid 14 in Example 3 was 0.30 mm. Further, although the sharp edge of the lid in the comparative example was not removed, when the lid was manufactured, the distal end of the inserted portion 23 was likely to be rounded. Accordingly, the edge-removal dimension R for the lid in the comparative example was 0.045 mm.

In the assembly test, an operation to insert the inserted portion 23 of the lid 14 into the opening S of the case body 13 for assembling was performed five times in Examples 1-3 and the comparative example. If filamentary foreign matter was developed at the inserted portion 23 at least once, this case was interpreted that the foreign matter was present. If filamentary foreign matter was never developed at the inserted portion 23, this case was interpreted that the foreign matter was absent. FIG. 4 shows the result.

As shown in FIG. 4, filamentary foreign matter was not developed in any of Examples 1 to 3, where the edge-removal dimension R was set to be greater than the lower limit 0.05 mm. In contrast, filamentary foreign matter was developed in the comparative example where the edge-removal dimension R was set to be smaller than the lower limit 0.05 mm.

This shows that the development of filamentary foreign matter is prevented by setting the edge-removal dimension R to be 0.05 mm or more especially 0.15 mm or more.

In the following, an operation of the rechargeable battery 10 will be described.

In the rechargeable battery 10, the corner 24 is present in the distal end of the inserted portion 23 and the sharp edge of the corner 24 is removed with the edge-removal dimension R. With this configuration, when the inserted portion 23 is inserted into the opening S of the case body 13, the distal end of the inserted portion 23 is prevented from being scraped by the inner circumferential surface 13e of the circumferential wall 13b.

According to the above embodiment, the following advantages are provided.

(1) In the rechargeable battery 10, the lid 14 includes the rounded corner 24 at the distal end of the inserted portion 23. Further, the lower limit of the edge-removal dimension R of the corner 24 is set to an average particle diameter of aluminum, which is a material for the lid 14. Accordingly, the distal end of the inserted portion 23 is formed to have a rounded shape in advance based on a dimension greater than the minimum size of filamentary foreign matter that may be developed by scraping when the inserted portion 23 is inserted into the case body 13. Accordingly, when the inserted portion 23 is inserted into the opening S of the case body 13, the distal end of the inserted portion 23 is prevented from developing filamentary foreign matter.

(2) The lower limit of the edge-removal dimension R is preferably set to the maximum particle diameter in the particle size distribution of aluminum. In this case, the sharp edge of the distal end of the inserted portion 23 is likewise removed in advance based on a size greater than the minimum size of filamentary foreign matter that may be developed and the average particle diameter. Accordingly, when the inserted portion 23 is inserted into the opening S of the case body 13, the inserted portion 23 is prevented from developing filamentary foreign matter.

(3) The edge-removal dimension R is set to be a value smaller than the value obtained by subtracting the clearance CL between the lid-side mating surface 22a and the case-side mating surface 13c from the thickness D of the inserted portion 23. Accordingly, even when the distal end of the inserted portion 23 is formed to have a rounded shape based on the edge-removal dimension R to prepare the corner 24, the body 25 is formed on the inserted portion 23. Accordingly, although the rounded corner 24 is included, the movement of the lid 14 in a plane direction of the case-side mating surface 13c is limited by the body 25 of the inserted portion 23.

(4) The corner 24 has such a shape that the distal end of the inserted portion 23 is rounded. With this structure, the boundary between the body 25 and the corner 24 is not angulated, so that the boundary is prevented from developing foreign matter. Further, sliding caused when the corner 24 is brought into contact with the inner circumferential surface 13e of the circumferential wall 13b also prevents the development of the foreign matter.

The above-described embodiment may be modified as follows.

As shown in FIG. 5, the corner 24 may be chamfered. In this case, the lower limit of the dimension for removal of the sharp edge (hereafter referred to as an edge-removal dimension C) for the corner 24 is likewise set to an average particle diameter of aluminum, which is the material for the lid 14. The lower limit is preferably set to the maximum particle diameter in the particle size distribution of aluminum. Further, the edge-removal dimension C is preferably set smaller than a value obtained by subtracting the clearance CL from the thickness D of the inserted portion 23. In addition, the edge-removal dimension C is preferably set to 0.15 mm or more.

As shown in FIG. 6, the rechargeable battery 10 may include a corner 13f at an inner circumferential edge extending along the opening S of the case body 13 instead of including the corner 24 on the inserted portion 23 of the lid 14. The case body 13 is rounded and has such a shape that the inner circumferential edge of the case body 13 is rounded. As mentioned above, in order to maximize the volume of the electrode assembly 12 accommodated within the case 11, the thickness of the case body 13 is designed to be as small as possible. In contrast, it is necessary to have a required thickness for the circumferential wall 13b of the case body 13 in order to have required rigidity for the case body 13. In view of this, it is necessary not to have an excessive dimension for removal of the sharp edge (hereafter referred to as an edge-removal dimension R) for the inner circumferential edge of the case body 13.

The lower limit of the edge-removal dimension R is set to an average particle diameter of aluminum, which is a material for the case body 13 as a member where the corner 13f is present. In the present embodiment, the lower limit is set to 0.05 mm. When the inserted portion 23 is inserted into the opening S of the case body 13, this value prevents the development of filamentary foreign matter resulting from scraping of the inner circumferential edge of the case body 13 by the distal end of the inserted portion 23.

By removing the sharp edge from the inner circumferential edge of the case body 13 in advance based on the edge-removal dimension R equal to or higher than the average particle diameter of aluminum, the inner circumferential edge of the case body 13 is prevented from being scraped by the distal end of the inserted portion 23 and the development of foreign matter of a minimum size that may be developed is prevented. Accordingly, the above inequality 1 holds.

$$\text{Average particle diameter} \leq \text{Edge-removal dimension } R \quad \text{(Inequality 1)}$$

Further, in the same manner as in the embodiment, by setting the edge-removal dimension R at the inner circumferential edge of the case body 13 to 0.15 mm or more, the development of filamentary foreign matter is prevented.

The corner 13f present in the inner circumferential edge of the case body 13 may be chamfered instead of being rounded.

Figure 7:
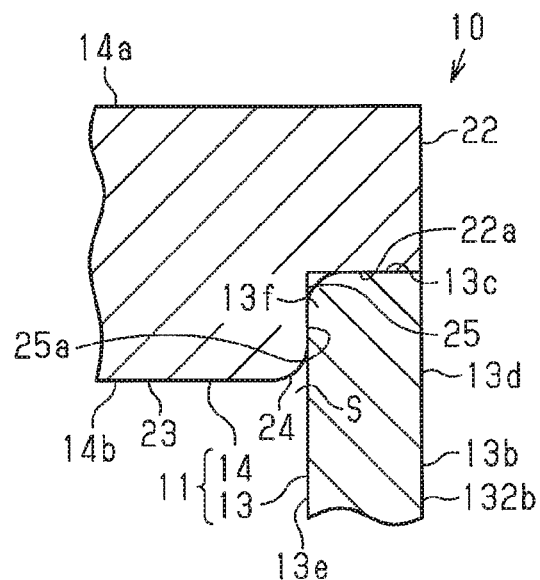
FIG. 7 is a partial cross-sectional view showing the corner of the lid and the corner of the case body in an enlarged manner.
Figure 8:
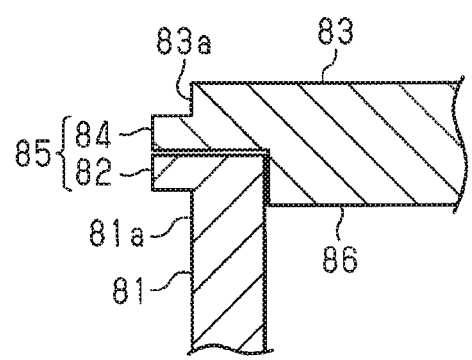
FIG. 8 is a partial cross-sectional view showing background art.

As shown in FIG. 7, the rechargeable battery 10 may also include the rounded corner 24 at the distal end of the inserted portion 23 in the case body 13 as well as the rounded corner 13f at the inner circumferential edge extending along the opening S of the case body 13. Further, the corner 13f and the corner 24 may be chamfered. Alternatively, one of the corner 13f at the inner circumferential edge of the case body 13 and the corner 24 at the distal end of the inserted portion 23 may be rounded and the other may be chamfered.

In the present embodiment, the clearance CL between the lid-side mating surface 22a and the case-side mating surface 13c is defined by the flatness of the lid-side mating surface 22a in the flange 22. However, if the flatness of the case-side mating surface 13c of the circumferential wall 13b is greater than the flatness of the lid-side mating surface 22a, the clearance CL may be defined by the flatness of the case-side mating surface 13c.

Materials for the case body 13 and the lid 14 may be any aluminum as long as press working is possible such as 3000 series or 8000 series other than 1000 series. Even with the aluminum of 3000 series or 8000 series, by forming the corner 13f and the corner 24, which are either rounded or chamfered, and setting the lower limit of the edge-removal dimension in the corner 13f and the corner 24 to an average particle diameter of the aluminum materials, the same advantages as in the embodiment will be provided.

The material for the lid 14 may be metal other than aluminum. In this case, the lower limit of the edge-removal dimension R or the edge-removal dimension C is altered depending on the material for the lid 14.

In the same manner, the material for the case body 13 may be metal other than aluminum. In this case, the lower limit of the edge-removal dimension R or the edge-removal dimension C is likewise altered depending on the material for the case body 13.

The lower limit of the edge-removal dimension R or the edge-removal dimension C in the corner 24 may be a value other than the maximum particle diameter in the particle size distribution as long as the lower limit is equal to or greater than an average particle diameter of the material for the lid 14 or the case body 13.

The case body 13 has a shape of a quadrangular tube with a closed end, and the lid 14 has a shape of a rectangular plate including the inserted portion 23 that has a shape of a quadrangular column. However, the case body 13 may have a shape of a circular cylinder or a hexagonal cylinder. The shapes of the inserted portion 23 and the lid body 14a of the lid 14 may be altered in accordance with the shape of the case body 13.

Although the rechargeable battery 10 is a lithium-ion battery, the rechargeable battery 10 is not limited to this and may be another rechargeable battery such as a nickel hydrogen battery.

The power storage device is not limited to the rechargeable battery 10. The power storage device may be a capacitor such as an electric double layer capacitor or a lithium ion capacitor.

DESCRIPTION OF THE REFERENCE NUMERALS

D . . . Thickness of the inserted portion, C, R . . . Edge-removal dimension at the corner, S . . . Opening, CL . . . Clearance, 10 . . . Rechargeable battery serving as power storage device, 13 . . . Case body, 13c . . . Case-side mating surface serving as opening end surface, 13e . . . Inner circumferential surface, 13f . . . Corner, 14 . . . Lid, 14a . . . Lid body, 23 . . . Inserted portion, 24 . . . Corner

The invention claimed is:

1. A power storage device comprising:
   a metal tubular case body with a closed end, the case body having an opening; and
   a metal lid that closes the opening, wherein
   the lid includes
      a lid body that closes the opening and is supported by an opening end surface of the case body, the opening end surface surrounding the opening,
      an inserted portion having a shape of a column, the inserted portion protruding from the lid body toward an inner part of the case body and extending along an inner circumferential surface of the case body, and
      a rounded or chamfered corner present in a distal end of the inserted portion in a protruding direction in which the inserted portion protrudes from the lid body, and
   a lower limit of an edge-removal dimension of the rounded corner or the chamfered corner is equal to an average particle diameter of a material for the lid.

2. The power storage device according to claim 1, wherein the lower limit of the edge-removal dimension of the corner is equal to a maximum particle diameter in a particle size distribution of the material for the lid.

3. The power storage device according to claim 1, wherein in a situation where a dimension of the inserted portion in the protruding direction represents a thickness of the inserted portion, the edge-removal dimension of the corner is smaller than a value obtained by subtracting a value of clearance between the lid body and the opening end surface from the thickness of the inserted portion.

4. The power storage device according to claim 1, wherein the edge-removal dimension of the corner is 0.15 mm or more.

5. The power storage device according to claim 1, wherein the power storage device is a rechargeable battery.

6. The power storage device according to claim 1, wherein the lid and the case body are made of aluminum.

7. A power storage device comprising:
   a metal tubular case body with a closed end, the case body having an opening; and
   a metal lid that closes the opening, wherein
   the lid includes a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner, which is present in at least one of a distal end of the inserted portion in a protruding direction in which the inserted portion protrudes from the lid body and an inner circumferential edge extending along the opening of the case body, and a lower limit of an edge-removal dimension of the rounded corner or the chamfered corner is equal to an average particle diameter of a material for a member where the corner is present.

8. The power storage device according to claim 7, wherein the corner is present in either the inserted portion of the lid or the case body where the Vickers hardness is lower.

9. The power storage device according to claim 8, wherein the Vickers hardness of the inserted portion is lower than the Vickers hardness of the case body, and the corner is present in the distal end of the inserted portion.

10. The power storage device according to claim 7, wherein the lower limit of the edge-removal dimension of the corner is equal to a maximum particle diameter in a particle size distribution of a material for the corner.

11. A method for manufacturing a power storage device, wherein the device includes a metal tubular case body with a closed end, the case body having an opening, and a metal lid that closes the opening, the lid has a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner present in a distal end of the inserted portion in a protruding direction in which the inserted portion protrudes from the lid body, the method comprising forming the rounded corner or the chamfered corner with a lower limit of an edge-removal dimension set to an average particle diameter of a material for the lid.

12. A method for manufacturing a power storage device, wherein the device includes a metal tubular case body with a closed end, the case body having an opening, and a metal lid that closes the opening, the lid has a lid body that closes the opening and is supported by an opening end surface of the case body, the opening end surface surrounding the opening, an inserted portion having a shape of a column, the inserted portion protruding from the lid body toward an inner part of the case body and extending along an inner circumferential surface of the case body, and a rounded or chamfered corner, which is present in at least one of a distal end of the inserted portion in a protruding direction in which the inserted portion protrudes from the lid body and an inner circumferential edge extending along the opening of the case body, the method comprising forming the rounded corner or the chamfered corner with a lower limit of an edge-removal dimension set to an average particle diameter of a material for a member in which the corner is formed.

* * * * *